H. LEAP.
ANTISKID AND TRACTION WHEEL.
APPLICATION FILED FEB. 23, 1915.
1,165,187.
Patented Dec. 21, 1915.
2 SHEETS—SHEET 1.
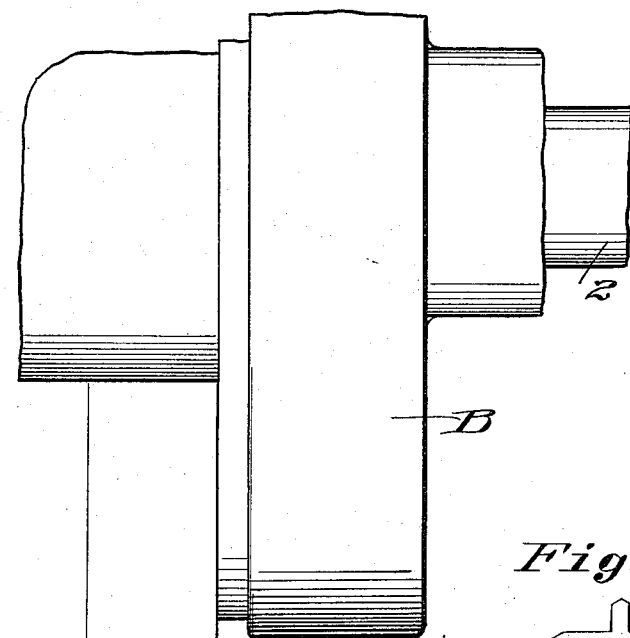
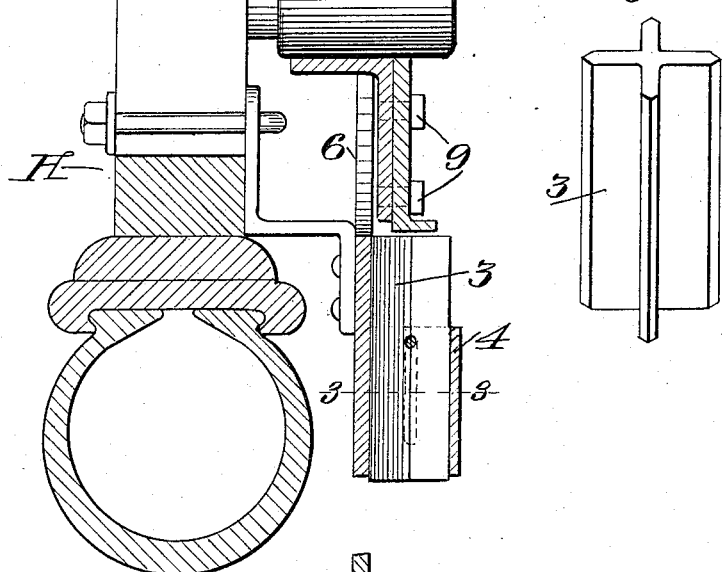
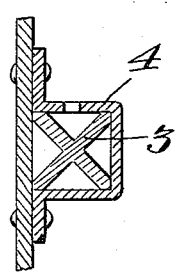
WITNESSES:
Alfred Cohen
Thos Eastberg
INVENTOR
Harry Leap.
BY G. H. String.
ATTORNEY

H. LEAP.
ANTISKID AND TRACTION WHEEL.
APPLICATION FILED FEB. 23, 1915.

1,165,187.

Patented Dec. 21, 1915.
2 SHEETS—SHEET 2.

UNITED STATES PATENT OFFICE.

HARRY LEAP, OF CAMP MEEKER, CALIFORNIA.

ANTISKID AND TRACTION WHEEL.

1,165,187.  Specification of Letters Patent.  Patented Dec. 21, 1915.

Application filed February 23, 1915. Serial No. 9,870.

*To all whom it may concern:*

Be it known that I, HARRY LEAP, a citizen of the United States, residing at Camp Meeker, in the county of Sonoma and State of California, have invented new and useful Improvements in Antiskid and Traction Wheels, of which the following is a specification.

My invention relates to an improved attachment for wheels, and is especially applicable to wheels of motor propelled vehicles.

It consists in the employment of friction producing shoes and a means for successively projecting such shoes into contact with the surface over which the vehicle is traveling, so as to prevent slipping or skidding and to provide for a sufficient traction on slippery surfaces.

The invention consists of the parts and the combination and construction of parts as hereinafter more fully described and claimed, having reference to the accompanying drawings, in which—

Figure 4:
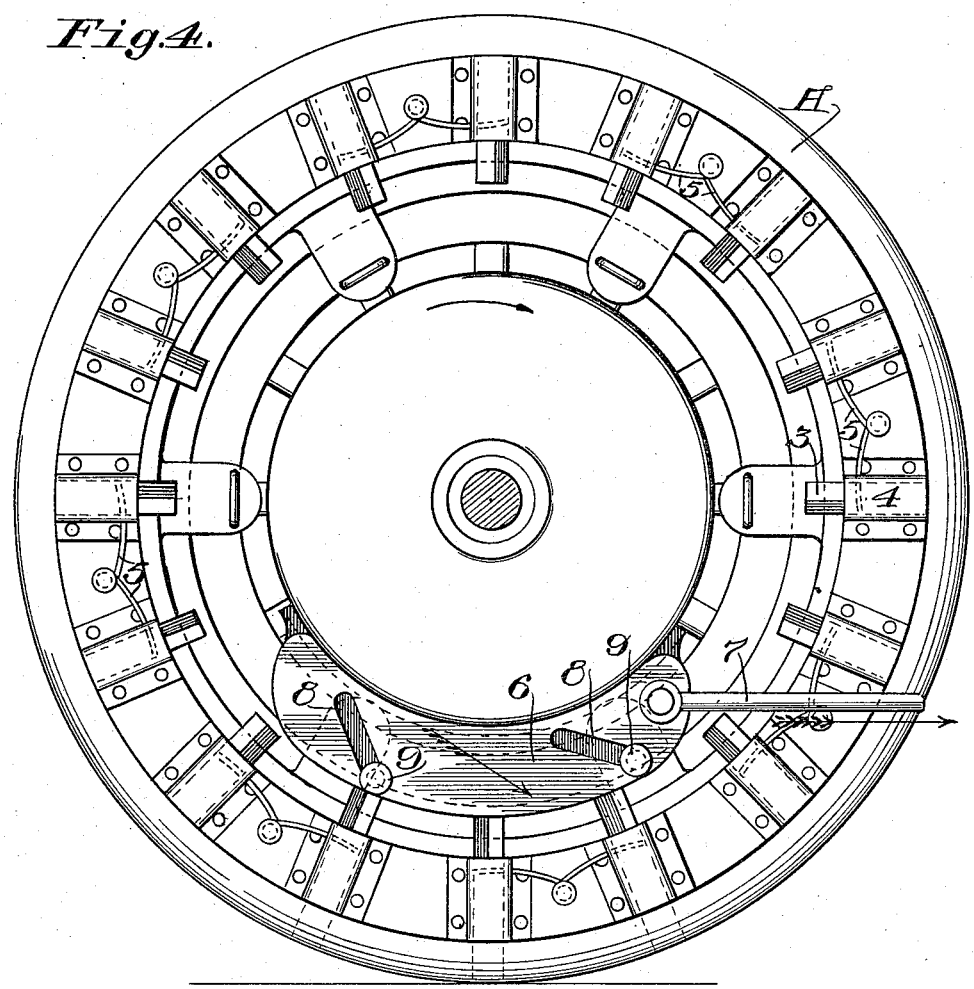
Figure 5:
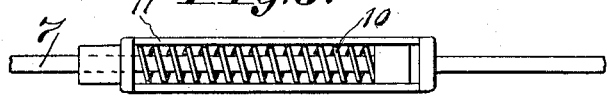

Figure 1 is a partial section of a wheel rim and of my attachments in connection with the brake apparatus of the wheel. Fig. 2 is a perspective view of one of the shoes. Fig. 3 is a section taken through line 3—3 of Fig. 1 showing the arrangement of the shoes and casing therefor. Fig. 4 is a side elevation of the wheel. Fig. 5 is a view showing the spring control of the actuating rod.

Great difficulty is experienced especially with rubber tired vehicles on account of the tendency to slip or skid on wet or clayey surfaces and to lose traction when power is applied to drive them. My invention is designed to correct this tendency.

As shown in the accompanying drawings, A represents a rubber tired wheel.

B is the brake drum carried by the axle 2 to which the wheel A is fixed.

My invention consists of radially slidable shoes which are alternately thrust forward when the portion of the wheel by which they are carried, is passing over the ground, so as to form a frictional contact with the ground, and to be withdrawn during the remainder of the revolution of the wheel. In the present case I have shown these shoes made in the form of crosses, as plainly shown at 3, in Fig. 2. These shoes are made of sufficient length and are each slidable in casings 4 which are carried by the wheel at sufficient close intervals and so positioned that the shoes may slide in and out of these casings radially. The casing is here shown rectangular as in Fig. 3, and the shoes have their angles so formed as to slide and be guided by the internal angles of the rectangular casing; although it will be understood that any suitable form for this purpose may be employed.

The shoes are normally retracted interior to the bearing periphery of the wheel by springs 5 attached to the wheel and here shown secured to the wheel at the central portion and the ends project so as to engage two adjacent shoes and retract them when in a released position. In order to project the shoes into contact with the ground, I have shown a cam 6 which is located below the brake drum and in line with the inner ends of the shoes, so that when this cam is in operative position the inner ends of each of the shoes contact with this cam and are forced forward, so as to strike the ground and make a frictional contact therewith. The amount of projection of the shoes may be varied. The operation of the cam is such that when not necessary or desirable, the cam may be retracted so that the shoes will not contact with the ground. When this contact is to be made the cam is moved by means of a rod or connection 7 which may be operated in any suitable manner by the driver of the machine. The cam is slotted as shown at 8, and these slots are movable upon fixed pins 9, so that when the cam is advanced in one direction it will also be thrust outwardly to engage the inner ends of the shoes, and thrust them forward. If it is only necessary to prevent slipping or skidding upon a hard surface like as asphaltum, the cam may be moved only sufficiently to cause the shoes to contact slightly with the surface, but if traction is necessary as in mud or snow, the cam may be moved so as to cause the shoes to be advanced to a greater length and more complete engagement with the surface over which they pass.

It will be manifest that only those shoes which are in actual contact or near the lower circumference of the wheel will be projected and they will be withdrawn immediately after passing beyond the cam.

In case of emergency the shoes may be projected into such contact with the surface as to serve as a brake and stop the car.

I have here shown a spring 10 inclosed in a case 11 and surrounding the rod which is freely slidable through one end of the casing, and has an enlargement at the inner end against which one end of the spring contacts while the other end is in contact with the opposite inner end of the casing so that the spring may be compressed when the rod 7 is moved to place the cam in position to act upon the shoes, and will be retracted when released. The shoes may be made of any suitable material, preferably hardened, or otherwise adapted to take a firm frictional hold upon the surface traveled over. These shoes may also serve when adjusted to about the normal bearing of the wheel, as a support in case of a blow-out or broken tire casing, so that the car may be driven at a reduced rate of speed, until a repair station is reached, without wear or destruction of a tire. It will also be obvious that the cam surface may be made elastic as in the form of elliptic springs, so that it will yield, in case the shoes pass irregular hard surfaces, and thus prevent jolts.

Having thus described my invention what I claim and desire to secure by Letters Patent is—

1. In combination with a wheel, a series of radially slidable shoes on the wheel arranged in pairs, means to successively project the shoes from the wheel tread, and a single spring rod for each pair of shoes for normally retaining the shoes inwardly of the tread, each rod being secured central of its length to the wheel and having its ends free and passed through perforations provided therefor in the respective shoes.

2. In combination with a wheel, a series of radially slidable shoes on the wheel arranged in pairs, means to successively project the shoes from the wheel tread, and a single spring for each pair of shoes composed of a spring rod having each of its ends free and connected to the respective shoes of the pair and being secured intermediate its ends to the wheel for normally retaining the shoes inwardly of the tread.

3. In combination with a wheel, a casing of rectangular cross-section secured to the wheel, a spring held shoe slidable in the casing and having a cruci-form cross-section, the side edges of the shoe being beveled to a point so as to fit the corners of the casing, and means to actuate and thereby move the shoe outwardly from the tread.

4. In combination with a wheel, the axle thereof, and a brake band on the axle, a series of radially slidable shoes on the wheel, a plate secured to the brake band and depending therefrom, a cam plate having inclined slots, pins passing through the slots and secured to said plate, a rod secured at one end to the cam and having a head on its other end, a case in which the head slides, and a coil spring surrounding the rod and abutting the rod head at one end and the outer end of the case at its other end.

In testimony whereof I have hereunto set my hand in the presence of two subscribing witnesses.

HARRY LEAP.

Witnesses:
JOHN H. HERRING,
W. W. HEALEY.

Copies of this patent may be obtained for five cents each, by addressing the "Commissioner of Patents, Washington, D. C."